(12) United States Patent
Gardner

(10) Patent No.: US 8,220,757 B2
(45) Date of Patent: Jul. 17, 2012

(54) CONDUIT HANGER

(75) Inventor: Michael J. Gardner, Hudson, OH (US)

(73) Assignee: Halex Co., Cleveland, OH (US)

( * ) Notice: Subject to any disclaimer, the term of this patent is extended or adjusted under 35 U.S.C. 154(b) by 119 days.

(21) Appl. No.: 12/760,443

(22) Filed: Apr. 14, 2010

(65) Prior Publication Data

US 2010/0264278 A1   Oct. 21, 2010

Related U.S. Application Data

(60) Provisional application No. 61/169,098, filed on Apr. 14, 2009.

(51) Int. Cl.
*F16L 3/00* (2006.01)

(52) U.S. Cl. ........ 248/58; 248/68.1; 248/67.7; 248/74.1

(58) Field of Classification Search .................. 248/68.1, 248/63, 74.1, 69, 74.3, 74.4, 49, 58, 61, 65, 248/62, 64, 67.7

See application file for complete search history.

(56) References Cited

U.S. PATENT DOCUMENTS

| 824,544 | A | * | 6/1906 | Hossege | 248/58 |
|---|---|---|---|---|---|
| 5,765,786 | A | * | 6/1998 | Gretz | 248/68.1 |
| 5,868,361 | A | * | 2/1999 | Rinderer | 248/58 |
| 6,857,606 | B1 | * | 2/2005 | Gretz | 248/68.1 |
| 7,891,614 | B2 | * | 2/2011 | Czajor | 248/68.1 |
| 2003/0025048 | A1 | * | 2/2003 | Knotts | 248/68.1 |
| 2010/0108824 | A1 | * | 5/2010 | Patchett et al. | 248/68.1 |

OTHER PUBLICATIONS

Halex Product Brochure 2008.

* cited by examiner

*Primary Examiner* — Terrell McKinnon
*Assistant Examiner* — Steven Marsh
(74) *Attorney, Agent, or Firm* — Emerson Thomson Bennett; Roger D. Emerson

(57) ABSTRACT

A conduit hanger may include a retaining portion with two walls and a connecting member that is adjustable between: (1) a first condition where an object is enclosed between the two walls; and, (2) a second condition where the object is not enclosed.

18 Claims, 9 Drawing Sheets

CONDUIT HANGER

This application claims priority to U.S. Ser. No. 61/169,098, entitled CONDUIT HANGER, filed Apr. 14, 2009, which is incorporated herein by reference.

BACKGROUND OF THE INVENTION

A. Field of Invention

The invention generally relates to methods and apparatuses concerning hangers used to support pipes, conduits, cables, and the like, to joists, rafters, trusses and other building structural support members of the like.

B. Description of the Related Art

Often, pipes, conduits, cables, wires, and similar objects extend along a structure, such as, for example, a ceiling, rafters, joists, beams, trusses, or struts, and are suspended or supported to such support structures with fasteners and/or straps. FIG. 9 shows a known conduit or pipe hanger 500 which includes a supporting surface 502 and a pair of arms 504 that extend from the supporting surface 502. A bolt or other fastener (not shown) is inserted through hole 506 formed in the supporting surface 502 to attach the conduit hanger 500 to the support structure. An object such as a pipe, conduit or the like is then inserted between the arms 504 and another fastener, bolt 508, is tightened to hold the object within the arms 504.

While known conduit or pipe hangers generally work well for their intended purposes, the use of fasteners may prove to be inconvenient and tedious. Further, fasteners may damage the object being suspended or the suspending structure. Known conduit or pipe hangers are limited to securing just one conduit or pipe per hanger. Known conduit or pipe hangers are limited to securing just one size conduit or pipe per hanger. Known conduit or pipe hangers are labor intensive to install in the building structure and then install the conduit or pipe. Accordingly, there is a need to provide a more efficient means of supporting pipe, conduit, cable, and the like.

SUMMARY OF THE INVENTION

According to one embodiment of this invention, a conduit hanger may comprise: a suspending portion having an attachment surface for use in attaching the conduit hanger to an associated structure that supports the conduit hanger; and, a retaining portion supported to the suspending portion and for use in retaining at least a first associated object. The retaining portion may comprise: a first wall that is substantially rigid and that has first and second ends; a second wall that is substantially rigid and that has first and second ends; wherein the first end of the first wall is pivotally connected to the first end of the second wall; and, a first connecting member that is adjustable between: (1) a first condition where the second end of the first wall is connected to the second end of the second wall to enclose the first associated object and to hold the first associated object between the first and second walls; and, (2) a second condition where the second end of the first wall is disconnected from the second end of the second wall and the first associated object can be inserted and removed from between the first and second walls. The first connecting member may remain connected to one of the first and second walls when in the first condition and when in the second condition.

According to another embodiment of this invention, a method may comprise the steps of: (A) providing a conduit hanger comprising: a suspending portion and a retaining portion supported to the suspending portion; the retaining portion comprising: a first wall that is substantially rigid and that has first and second ends; a second wall that is substantially rigid and that has first and second ends; wherein the first end of the first wall is pivotally connected to the first end of the second wall; and a first connecting member connected to the second wall; (B) attaching the suspending portion to an associated structure; (C) inserting a first associated object between the first and second walls; (D) pivoting the second wall with respect to the first wall toward the first wall; and, (E) adjusting the first connecting member to connect the second wall to the first wall to enclose the first associated object and to hold the first associated object between the first and second walls.

According to yet another embodiment of this invention, a conduit hanger may comprise: a suspending portion having an attachment surface for use in attaching the conduit hanger to an associated structure that supports the conduit hanger; and, a retaining portion for use in retaining at least first and second associated objects. The retaining portion may comprise: a first wall that is supported to the suspending portion and that has first and second ends; a second wall that has first and second ends; and, a third wall that has first and second ends. The first end of the first wall is pivotally connected to the first end of the second wall with a spring pivot, and the first end of the first wall is pivotally connected to the first end of the third wall with a spring pivot. A first connecting member may be adjustable between: (1) a first condition where the second end of the first wall is connected to the second end of the second wall to enclose the first associated object and to hold the first associated object between the first and second walls; and, (2) a second condition where the second end of the first wall is disconnected from the second end of the second wall and the first associated object can be inserted and removed from between the first and second walls. A second connecting member may be adjustable between: (1) a first condition where the second end of the first wall is connected to the second end of the third wall to enclose the second associated object and to hold the second associated object between the first and third walls; and, (2) a second condition where the second end of the first wall is disconnected from the second end of the third wall and the second associated object can be inserted and removed from between the first and third walls.

One advantage of this invention is that pipe and other such objects can be easily suspended from support structures without the use of fasteners. Another advantage of this invention is that a conduit hanger can be easily adjusted to support pipes, conduits, and the like of varying sizes.

Another benefit of this invention is the ability to secure or mount multiple conduits or pipes with one device thereby (1) saving material costs due to fewer devices; (2) saving labor due to the installation of fewer devices; and (3) using less length of the strut by installing only one device rather than several.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Figure 1:
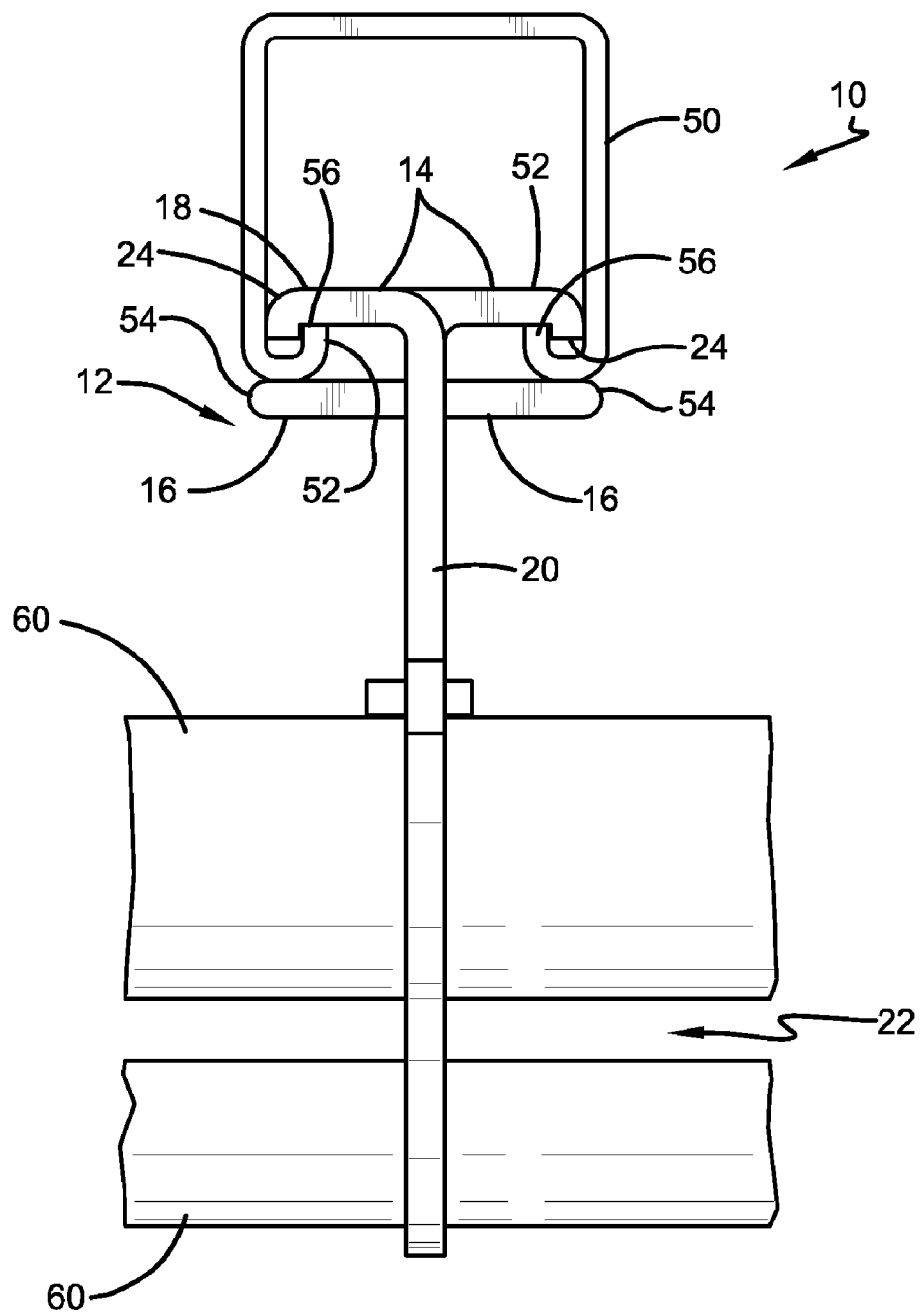
FIG. 1 is a end view of a conduit hanger shown supporting objects to a support structure.
Figure 2:
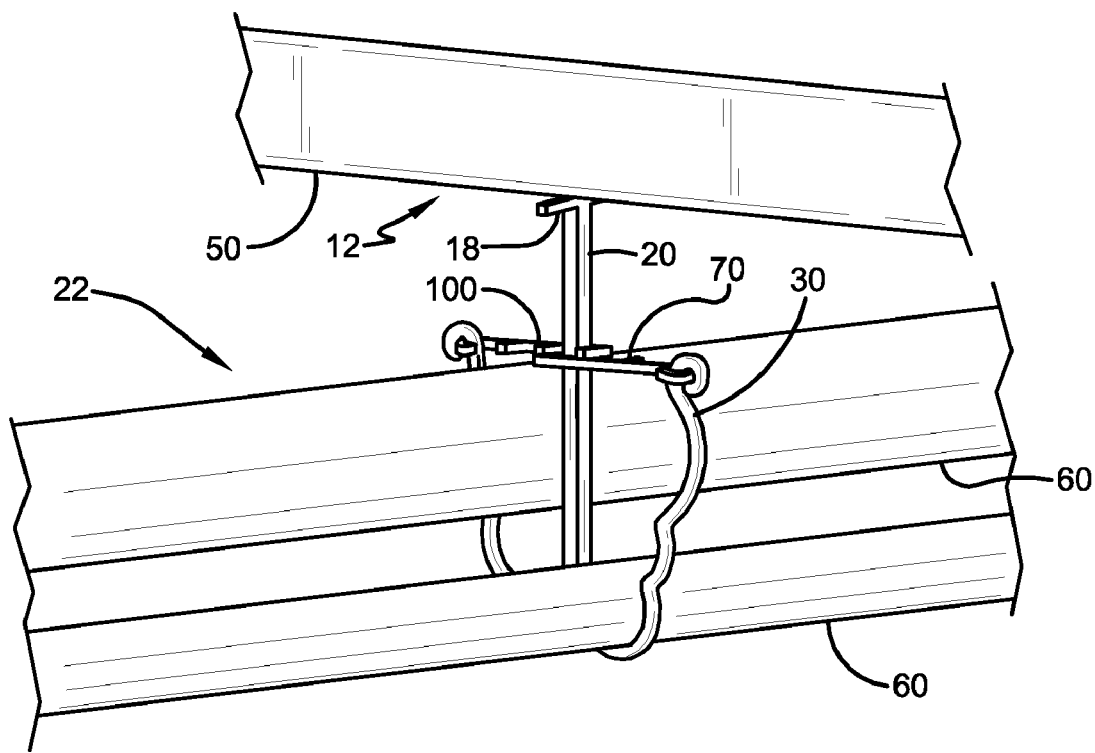
FIG. 2 is a perspective view of the conduit hanger shown in FIG. 1.

Referring now to the drawings wherein the showings are for purposes of illustrating embodiments of the invention only and not for purposes of limiting the same, and wherein like reference numerals are understood to refer to like components, FIGS. 1 and 2 show a conduit hanger 10 that is supporting a pair of objects 60, 60 to a support structure 50, according to one embodiment of this invention. It should be noted that the expression conduit hanger "conduit hanger" refers to any device used to support objects (including but not limited to pipes, conduits, cables, wires, tubes, ducts, and bus bars) to a support structure. It should also be noted that "support structure" refers to any structure to which a conduit hanger may be supported (including but not limited to ceilings, rafters, joists, beams, trusses, and struts). The conduit hanger 10 may include a suspending portion 12 and a retaining portion 22.

With reference now to FIGS. 1-5, the suspending portion 12 may be generally formed and shaped for engaging a desired support structure 50 from which the conduit hanger 10 suspends or hangs For this purpose the suspending portion 12 may have an attachment surface 18, formed in any manner chosen with the sound judgment of a person of skill in the art, for use in attaching the conduit hanger 10 to the support structure 50. For the embodiments shown, the attachment surface 18 includes a pair of upper members 14, 14 and a pair of lower members 16, 16. The upper members 14, 14 permit the conduit hanger 10 to suspend from the support structure 50 and the lower members 16, 16 aid in maintaining the conduit hanger 10 to the support structure 50 by limiting upward movement of the conduit hanger 10. While the upper members 14, 14 shown extend in opposite directions and are parallel with each other and the lower members 16, 16 similarly extend in opposite directions and are parallel with each other, it is to be understood that these orientations are exemplary only. In one embodiment (not shown) the upper members 14, 14 are parallel with the lower members 16, 16. In another embodiment, shown in FIGS. 3 and 5, the upper members 14, 14 are not parallel with the lower members 16, 16 and thus are offset by offset angle OA. This offset can aid in the installation of the conduit hanger 10, as further described below. In one embodiment, this offset can increase the available surface area (on top of the lower members 16, 16) that can be used to limit upward movement of the conduit hanger 10. This offset can also aid in securing the conduit hanger 10 to the support structure 50, as further described below.

Figure 3:
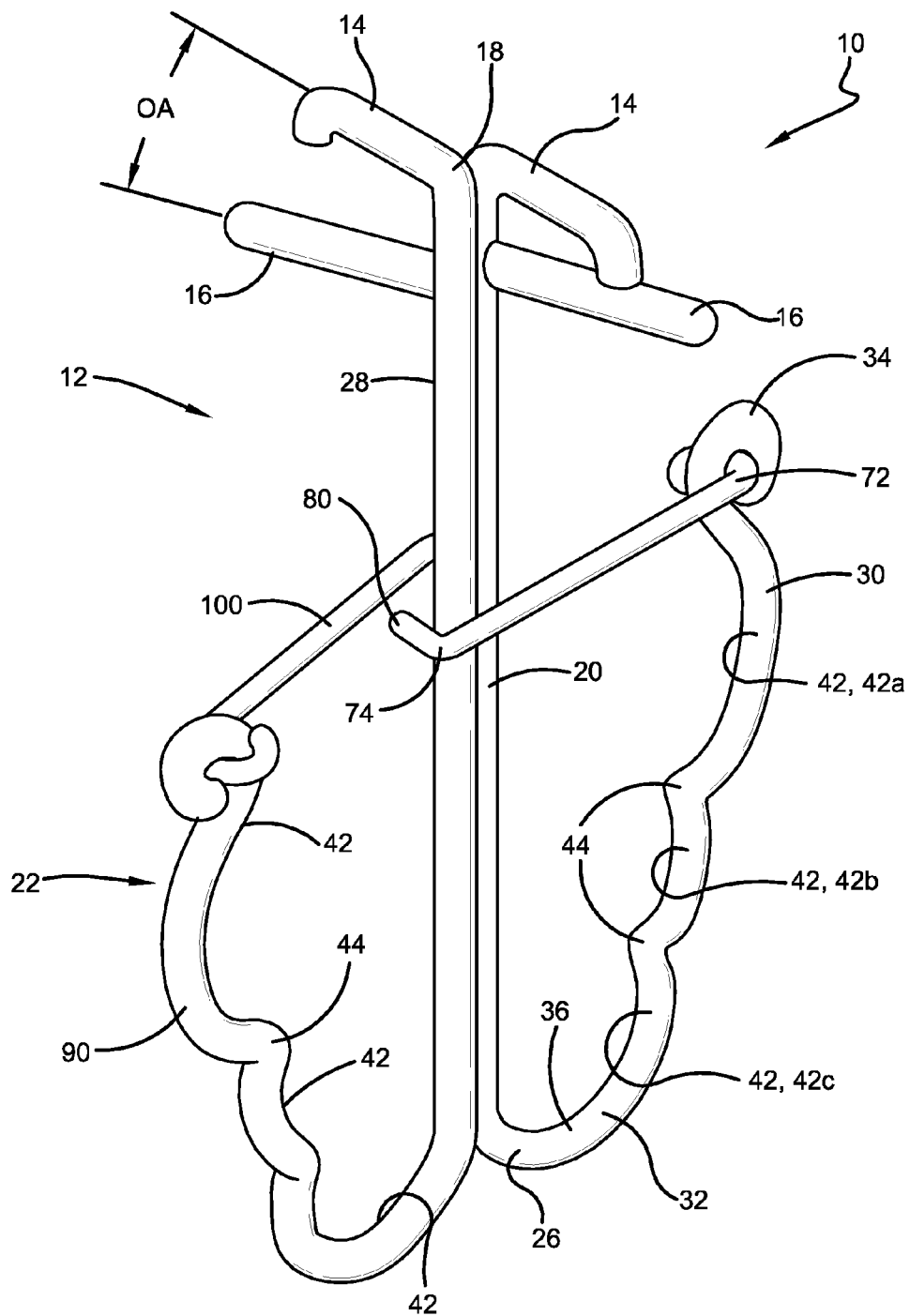
FIG. 3 is a perspective side view of a conduit hanger.
Figure 4:
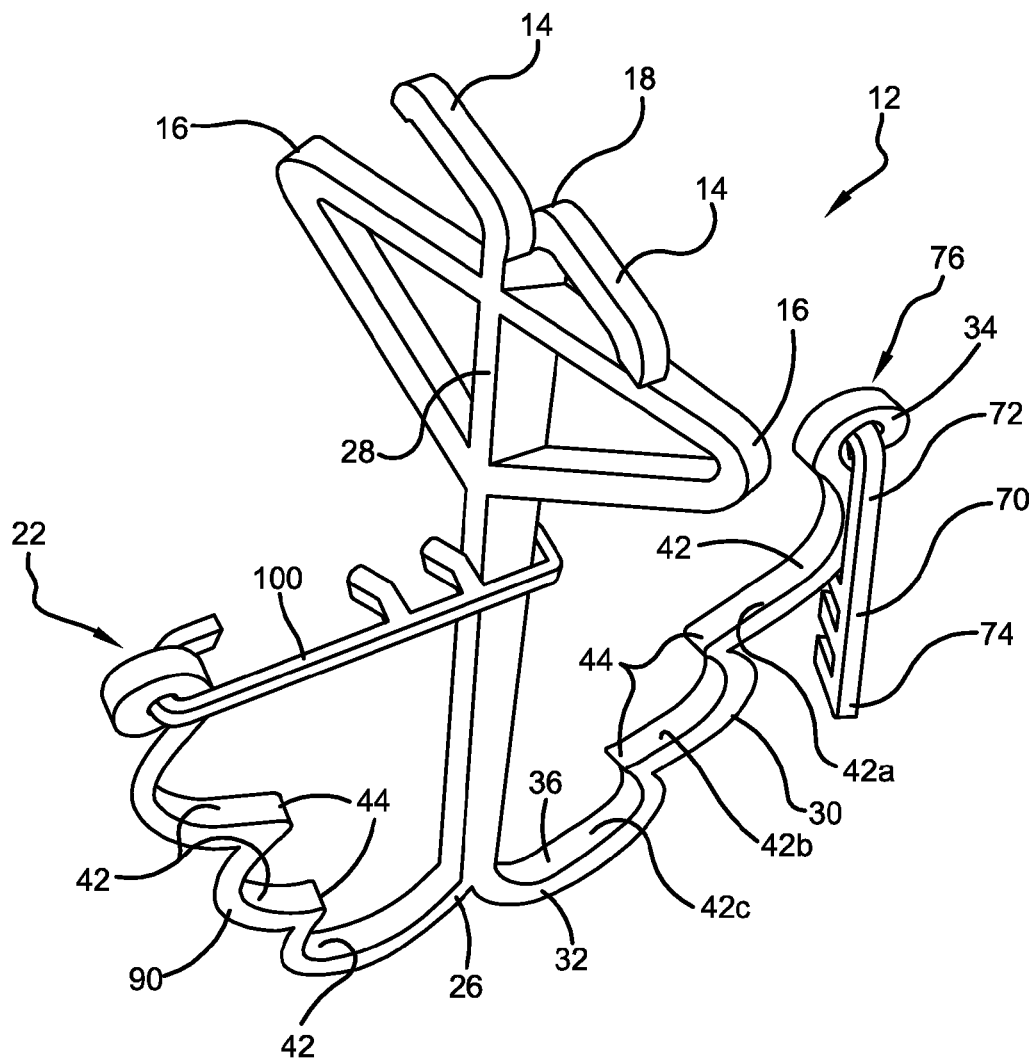
FIG. 4 is a perspective top view of a conduit hanger showing one connection member connected and the other connection member disconnected.
Figure 5:
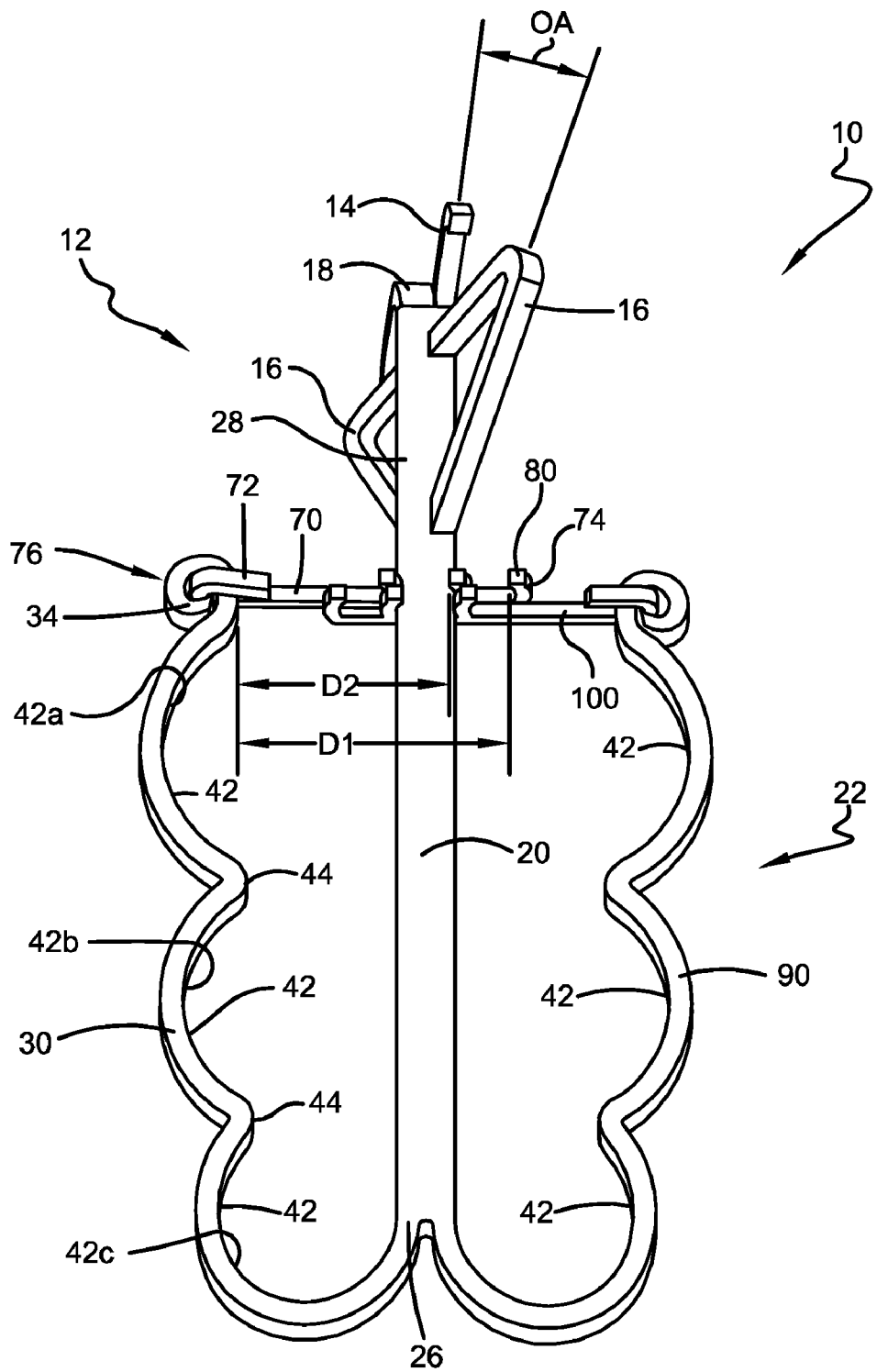
FIG. 5 is a side perspective view of the conduit hanger of FIG. 4 but showing both connection members connected.
Figure 6:
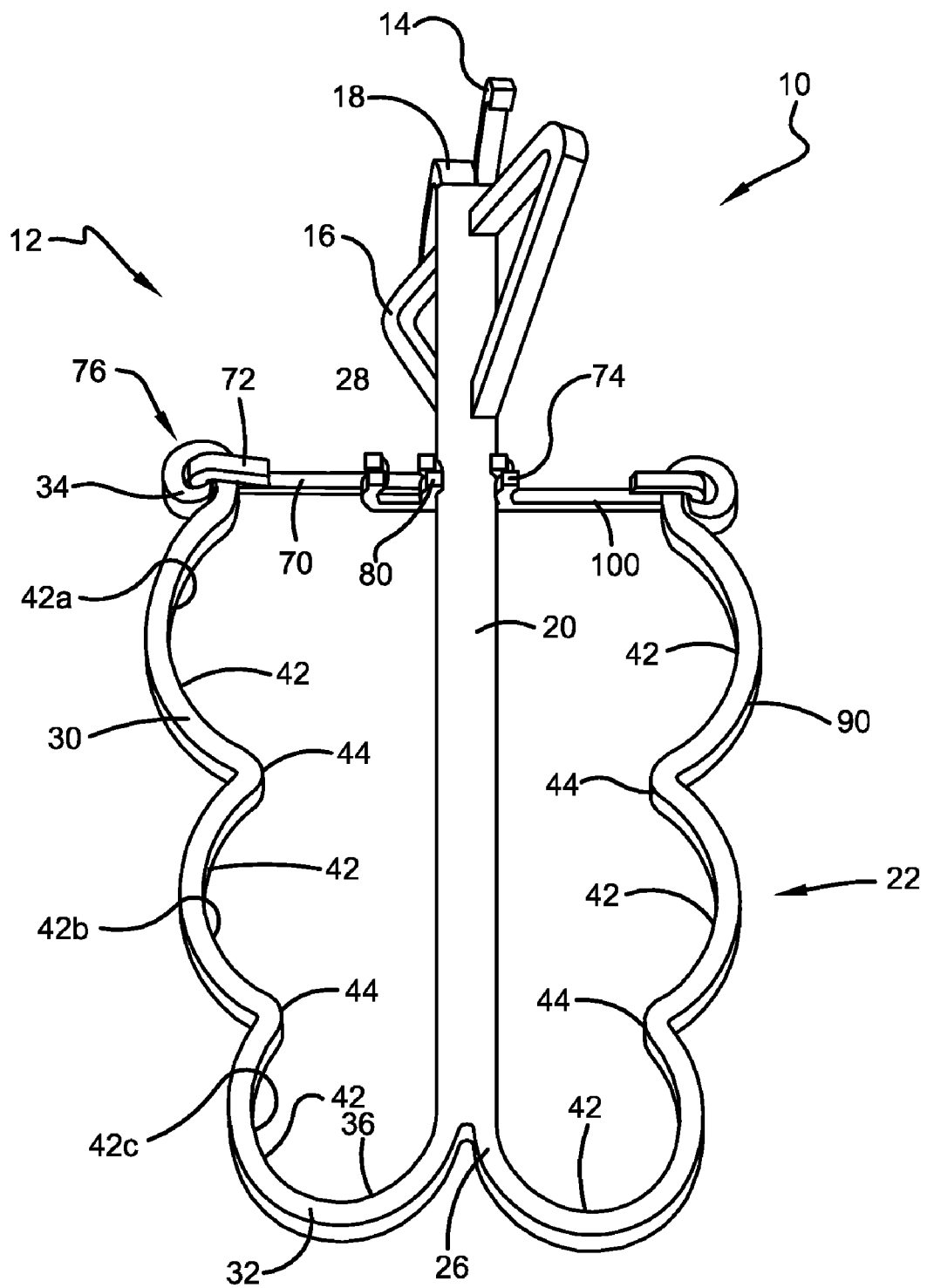
FIG. 6 is a side perspective view similar to that shown in FIG. 5 but showing one of connection members connected at a different adjustment.
Figure 7:
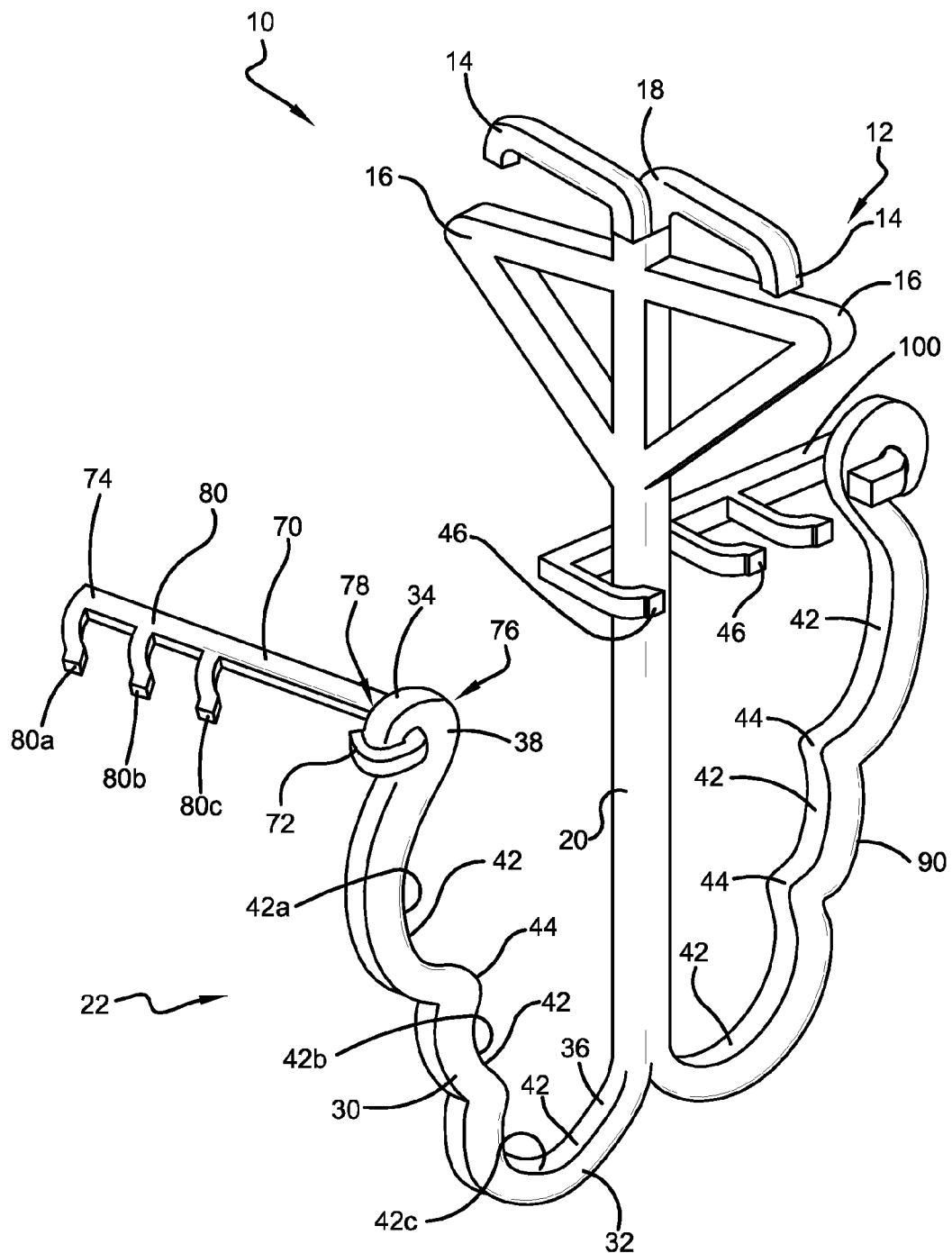
FIG. 7 is a perspective top view of a conduit hanger showing one connection member connected and the other connection member disconnected.
Figure 8:
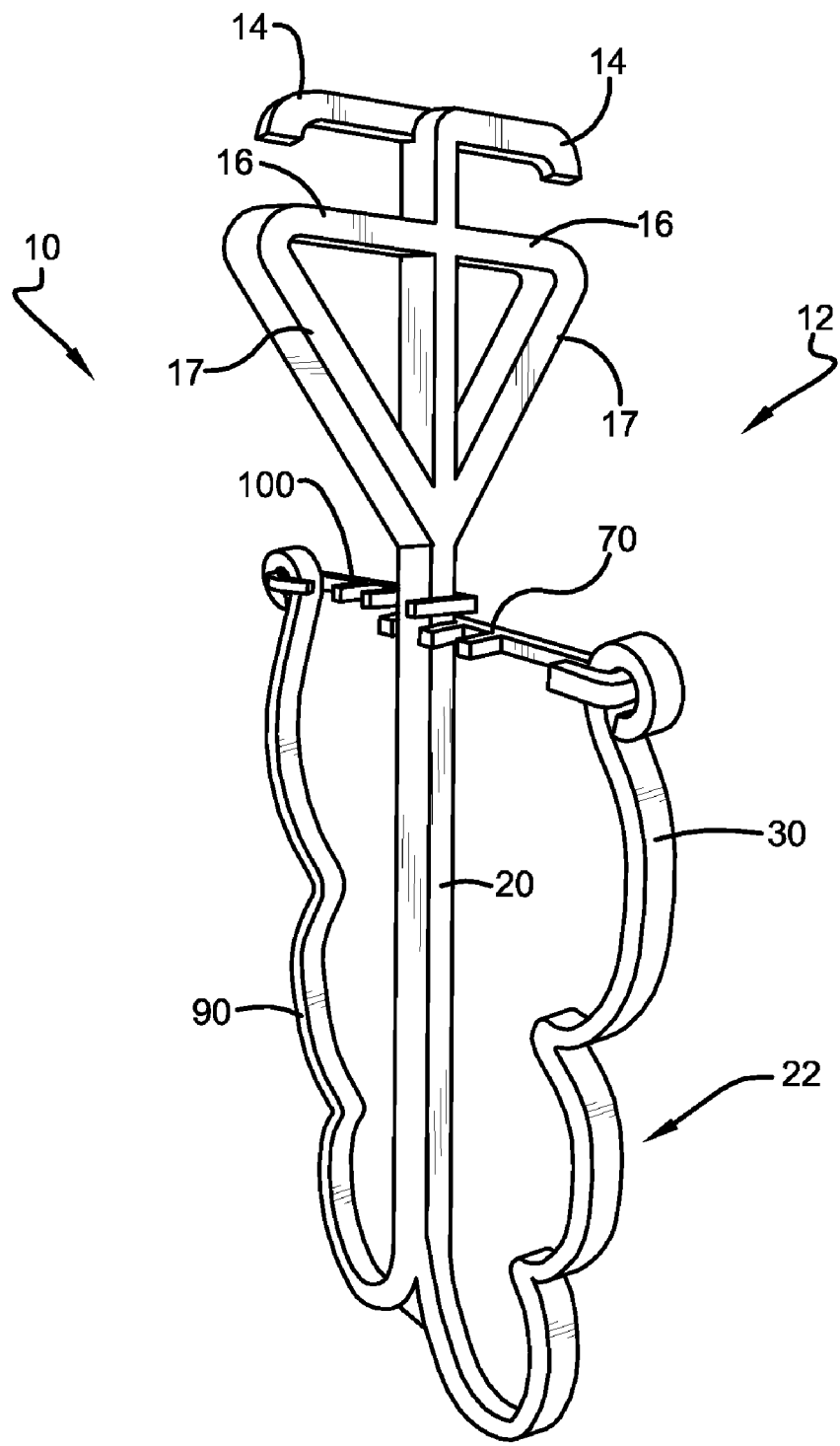
FIG. 8 is a perspective side view of a conduit hanger showing both connection members connected.
Figure 9:
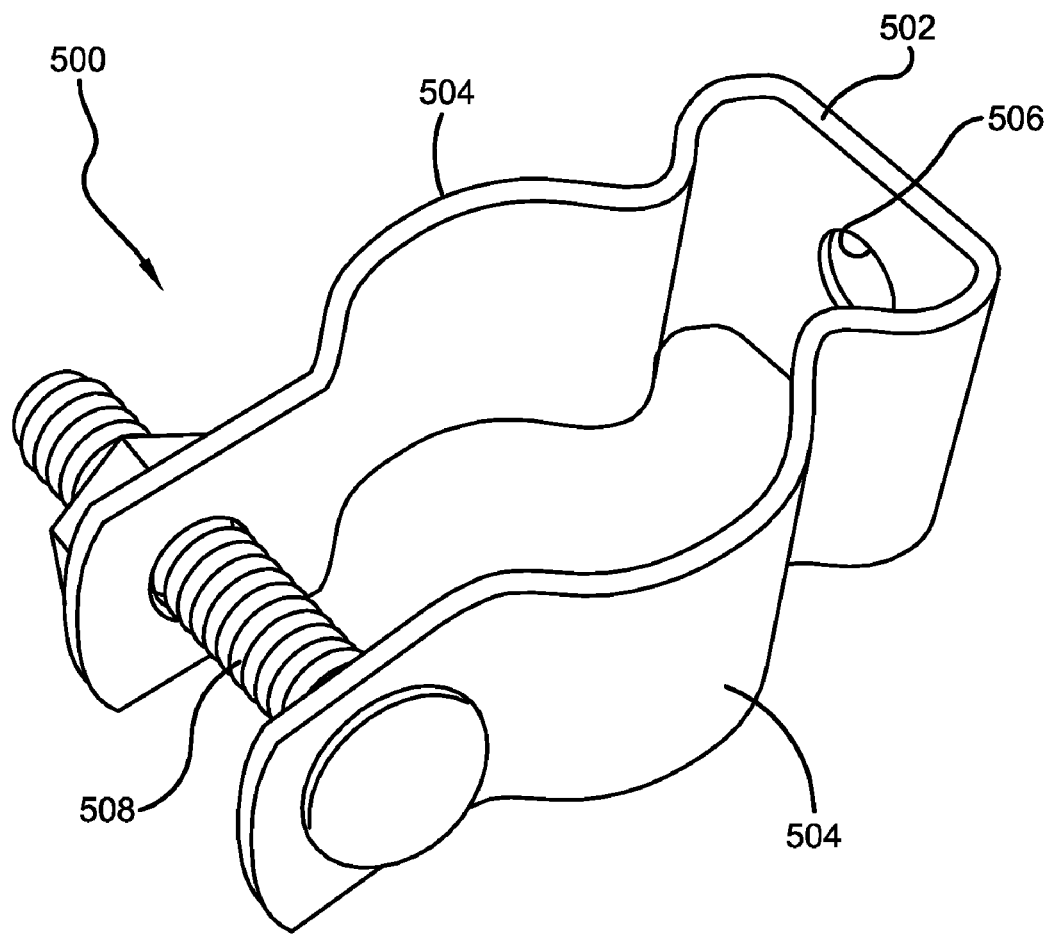
FIG. 9 is a perspective view of a known conduit hanger.

With reference now to FIGS. 1-3, to attach the suspending portion 12 to the support structure 50, the upper members 14, 14 are inserted into an opening 52 formed in the support structure 50. The amount of insertion into the opening 52, and thus the upward movement of the conduit hanger 10, can be limited because the top surfaces of the lower members 16, 16 contact the lower surfaces 54, 54 of the support structure 50 juxtaposed to the opening 52. The conduit hanger 10 is then rotated with respect to the support structure 50 and released. In this state, shown in FIG. 1, the conduit hanger 10 is suspended from the support structure 50 with the bottom surfaces of the upper members 14, 14 contacting the surfaces 56, 56 of the support structure 50. The distal ends of the upper members 14, 14 may have downwardly extending lips 24, 24 to make the attachment of the upper members 14, 14 to the support structure 50 more secure. It should be noted that the embodiments here described, as well as similar designs chosen with the sound judgment of a person of skill in the art, provide the advantage of not requiring any fasteners.

With reference now to FIGS. 3-8, the retaining portion 22 may be supported to the suspending portion 12 and used to retain at least one object 60. The retaining portion 22 may include a first wall 20, having first and second ends 26, 28, and a second wall 30, having first and second ends 32, 34. While the manner in which the retaining portion 22 is supported to the suspending portion 12 can be any chosen with the sound judgment of a person of skill in the art, for the embodiment shown the attachment surface 18 is connected to an upper portion of the first wall 20. The first and second walls 20, 30 may be formed and sized in any manner chosen with the sound judgment of a person of skill in the art. In one embodiment, the first and second walls 20, 30 are rigid and formed of a metal, such as steel. The first end 26 of the first wall 20 may be pivotally connected to the first end 32 of the second wall 30. This pivotal connection 36 can be of any type chosen with the sound judgment of a person of skill in the art. In one embodiment, shown, the pivotal connection 36 is a spring pivot. By "spring pivot" it is meant that the characteristics of the materials used to make the first and second walls 20, 30 enable them to function as a spring that biases the first and second walls 20, 30 to maintain their original relative position. If a force is applied to change their original relative position (such as a force to move the second wall 30 relatively closer to the first wall 20) the first and second walls 20, 30 will pivot relative to each other in a first direction about the pivotal connection 36. If the force is removed, the first and second walls 20, 30 will pivot (because of the inherent biasing force) relative to each other in a second direction about the pivotal connection 36 back to the original relative position. As the operation of a spring pivot is known to a person of skill in the art, further details will not be provided here.

With continuing reference to FIGS. 3-8, the second wall 30 may have an inner surface with one or more profiled areas 42 formed thereon; three profiled areas 42a, 42b, and 42c are shown. The profiled areas 42 may be sized and shaped to receive correspondingly sized and shaped objects 60 in any manner chosen with the sound judgment of a person of skill in the art. In one non-limiting embodiment, shown, the profiled areas 42 are curvilinear recesses to receive objects 60 having corresponding curvilinear outer surfaces. If it is desired to maintain a spaced relationship between two or more objects 60 retained within the retaining portion 22, borders 44 may be positioned between the profiled areas 42. Though not shown, it is also contemplated to provide profiled areas on the first wall 20.

With reference now to FIGS. 2-8, the retaining portion 22 may also include a first connecting member 70 that is adjustable between: (1) a first condition (shown in FIGS. 2 and 3) where the second end 28 of the first wall 20 is connected to the second end 34 of the second wall 30 to enclose at least one object 60 and to hold the object 60 between the first and second walls 20, 30; and, (2) a second condition (shown in FIGS. 4 and 7) where the second end 28 of the first wall 20 is disconnected from the second end 34 of the second wall 30 and the object 60 can be inserted and removed from between the first and second walls 20, 30. The first connecting member 70 may be formed and sized in any manner chosen with the sound judgment of a person of skill in the art. In one embodiment, the first connecting member 70 is rigid and formed of a metal, such as steel. In one embodiment, the first connecting member 70 remains connected to one of the first and second walls 20, 30 when in the first condition and when in the second condition. In this case the connecting member 70 is not separated from the conduit hanger 10 and thus cannot be misplaced. In one specific embodiment, shown, the first connecting member 70 has a first end 72 that remains connected to the second end 34 of the second wall 30 and a second end 74 that connects to the first wall 20.

With reference now to FIGS. 3-8, the connection of the first connecting member 70 to the second wall 30 can be of any type chosen with the sound judgment of a person of skill in the art. In one embodiment, the first end 72 of the first connecting member 70 is pivotally connected to the second end 34 of the second wall 30. The pivotal connection 76 between the first end 72 of the first connecting member 70 and the second end 34 of the second wall 30, if used, can be of any type chosen with the sound judgment of a person of skill in the art such as a spring pivot. For the embodiment shown, the pivotal connection 76 comprises a pivot rod 78 (FIG. 7) formed on the first end 72 of the first connecting member 70 that is received within a hole 38 formed in the second end 34 of the second wall 30. The first end 72 of the first connecting member 70, including the pivot rod 78, may be U-shaped as shown to secure the connecting member 70 to the second wall 30.

With continuing reference to FIGS. 3-8, the connection of the first connecting member 70 to the first wall 20 can be of any type chosen with the sound judgment of a person of skill in the art. In one embodiment, the second end 74 of the first connecting member 70 has a hook member 80 that receives the first wall 20 when the first connecting member 70 is in the first condition. The hook member 80 may extend laterally from the first connecting member 70, as shown. In another embodiment, shown for example in FIGS. 4-7, the first connecting member 70 may have multiple hook members 80; three hook members 80a, 80b, 80c shown. The use of multiple hook members 80 allows for adjustment of the first connecting member 70 with respect to the first wall 20 to accommodate different sized objects 60. For example, the first connecting member 70 can be adjusted into the first condition (where the second end 28 of the first wall 20 is connected to the second end 34 of the second wall 30 to enclose the object 60) by positioning the first hook member 80a to receive the first wall 20. This adjustment would space the second end 34 of the second wall 30 from the first wall at a distance D1 (see FIG. 5). As another example, the first connecting member 70 can be adjusted into the first condition (where the second end 28 of the first wall 20 is connected to the second end 34 of the second wall 30 to enclose the object 60) by positioning the second hook member 80b to receive the first wall 20. This adjustment would space the second end 34 of the second wall 30 from the first wall at a distance D2 (see FIG. 5). In a similar manner the third hook member 80c would space the second end 34 of the second wall 30 from the first wall at another distance. The number and spacing of hook members 80 can be any chosen with the sound judgment of a person of skill in the art. To position the hook member 80 at a specific location on the first wall 20, the first wall 20 may have a groove 40 on its outer surface. The edges of the groove 40 act as stops to limit the hook member 80, and thus the first connecting member 70, from moving along the longitudinal axis of the first wall 20.

Still referring to FIGS. 3-8, in another embodiment, the retaining portion 22 may have a third wall 90 and a second connecting member 100. The third wall 90 and second connecting member 100 may be formed in a manner similar to the second wall 30 and first connecting member 70, respectively and they may operate with the first wall 20 in a manner similar to the way the second wall 30 and first connecting member 70 operate with the first connecting member 70. In this way objects 60 can be supported to the conduit hanger 10 on both sides of the first wall 20. In one embodiment, shown, the third wall 90 is a "mirror image" to the second wall 30. However, it is also contemplated to provide the third wall 90 to vary from the second wall 30. Some non-limiting examples include: providing the third wall 90 to be of a different length than the second wall 30; providing the third wall 90 to extend from the first end 26 of the first wall 20 at a different angle than the second wall 20 extends from the first end 26 of the first wall 20; providing the third wall 90 to pivot with respect to the first end 26 of the first wall 20 in a different manner than the second wall 20 pivots from the first end 26 of the first wall 20; and, providing the third wall 90 with profiled areas 42 that are different (in number, size, and/or shape) than the profiled areas 42 on the second wall 20. The first, second, and third walls 20, 30, 90 can be positioned relative to each other in any manner chosen with the sound judgment of a person of skill in the art. In one embodiment, shown, the first, second, and third walls 20, 30, 90 are positioned to lie on the same plane. The second connecting member 100 may have one or more hooks 80 that may be received in a groove 46 formed on the outer surface of the first wall 20 in a manner similar to the groove 40. In one embodiment, the grooves 40, 46 may have heights along the longitudinal axis of the first wall 20 that are approximately equal to the thicknesses of both connecting members 70, 100, as shown, to provide for a secure connection between the connecting members 70, 100 and the first wall 20.

Still referring to FIGS. 3-8, each lower member 16 may include a gusset portion 17 to provide additional axial strength to the conduit hanger 10. In one embodiment, the gusset portion 17 is positioned between an end of the lower member 16 and the wall 20. The gusset portion 17 can provide additional axial strength to resist deflection of the conduit hanger 10 when wire is inserted or pulled through the conduit or pipe 60.

With reference now to FIGS. 1-8, the operation of the conduit hanger 10 will now be discussed. First, the suspending portion may be 12 may be attached to the support structure 50. In one embodiment, described above, the upper members 14, 14 are inserted into an opening 52 formed in the support structure 50 until the top surfaces of the lower members 16, 16 contact the lower surfaces 54, 54 of the support structure 50. The conduit hanger 10 is then rotated with respect to the support structure 50 and released. In another embodiment, the upper members 14, 14 are inserted into the opening 52 until downwardly extending lips 24, 24 of the upper members 14, 14 clear or pass above the upturned ends of the strut 50. The conduit hanger 10 is then rotated with respect to the strut 50 and the lower members 16, 16 engage the lower surfaces 54, 54 of the strut 50. Fasteners are not required with either of these embodiments. One or more objects 60 are then positioned between the first and second walls 20, 30. If profiled areas 42 are provided, the objects 60 may be positioned within them. The second wall 30 is then pivoted with respect to the first wall 20 (for the embodiment shown, the second wall 30 is pivoted toward the first wall 20) and the first connecting member 70 is adjusted (by pivoting motion in one embodiment) to connect to the first wall 20. This connection encloses the object(s) 60 and holds the object(s) 60 between the first and second walls 20, 30. If the first connecting member 70 has a hook member 80, the first connecting member 70 is adjusted to connect to the first wall 20 by attaching the hook member 80 to the first wall 20. If the first wall 20 has a groove 40, the hook member is inserted within the groove 40. If the first connecting member 70 has multiple hook members 80, then the hook member that provides the desired amount of enclosure is attached to the first wall 20.

Still referring to FIGS. 1-8, if the conduit hanger 10 has a third wall 90 and a second connecting member 100, then they may be operated similar to the second wall 30 and the first connecting member 70 to enclose one or more objects 60 between the third wall 90 and the first wall 20. To remove the objects 60, it is only necessary to detach the connecting member(s) 70, 10 (such as by pivoting them) and then pivot the corresponding walls 30, 90 away from the first wall 20. The object(s) 60 can then be easily removed from the conduit hanger 10. If desired, the conduit hanger 10 can be removed from the support structure 50. In one embodiment, the conduit hanger 10 is rotated with respect to the support structure 50 until the upper members 14, 14 are aligned with the opening 52. The conduit hanger 10 will then easily "fall out" of the opening 52 and is available for reuse. Fasteners are not required with this embodiment.

Numerous embodiments have been described, hereinabove. It will be apparent to those skilled in the art that the above methods and apparatuses may incorporate changes and modifications without departing from the general scope of this invention. It is contemplated, for example, to make the conduit hanger modular. Various second and/or third walls, for example, may be attachable to a given first wall. This would allow for the use of different sized, shaped, angled, etc. walls with a given first wall. Similarly, various connecting members may be used with a given first wall and/or specified second and/or third walls. Different attachment surfaces could also be used to allow for attachment to various support structures. Each component of the conduit hanger may be formed monolithically, or independently, and may be formed of any desired material having sufficient strength and rigidity to suspend the objects desired. Such material may be electrically non-conductive. It is intended to include all such modifications and alterations in so far as they come within the scope of the appended claims or the equivalents thereof

Having thus described the invention, it is now claimed:

1. A pipe hanger comprising:
   a suspending portion having an attachment surface for use in attaching the pipe hanger to an associated structure that supports the pipe hanger; and,
   a retaining portion supported to the suspending portion and for use in retaining at least a first associated object, the retaining portion comprising:
      a first wall that is substantially rigid and that has first and second ends;
      a second wall that is substantially rigid and that has first and second ends;
      wherein the first end of the first wall is pivotally connected to the first end of the second wall;
      a first connecting member that is adjustable between: (1) a first condition where the second end of the first wall is connected to the second end of the second wall to enclose the first associated object and to hold the first associated object between the first and second walls; and, (2) a second condition where the second end of the first wall is disconnected from the second end of the second wall and the first associated object can be inserted and removed from between the first and second walls;
      wherein the first connecting member remains connected to one of the first and second walls when in the first condition and when in the second condition;
      a third wall that is substantially rigid and that has first and second ends;
      wherein the first end of the first wall is pivotally connected to the first end of the third wall;
      a second connecting member that is adjustable between: (1) a first condition where the second end of the first wall is connected to the second end of the third wall to enclose a second associated object and to hold the second associated object between the first and third walls; and, (2) a second condition where the second end of the first wall is disconnected from the second end of the third wall and the second associated object can be inserted and removed from between the first and third walls; and,
      wherein the second connecting member remains connected to one of the first and third walls when in the first condition and when in the second condition.

2. The pipe hanger of claim 1 wherein the attachment surface attaches the pipe hanger to the associated structure without the use of fasteners.

3. The pipe hanger of claim 1 wherein the attachment surface comprises:
   a pair of upper members that permit the pipe hanger to suspend from the associated structure; and,
   a pair of lower members that aid in maintaining the pipe hanger to the associated structure by resisting upward movement of the pipe hanger.

4. The pipe hanger of claim 1 wherein:
   the second wall has an inner surface with first and second profiled areas;
   the first profiled area is sized and shaped to receive the first associated object;
   the second profiled area is sized and shaped to receive a second associated object;
   when the first connecting member is in the first condition the second associated object is enclosed and held between the first and second walls; and,
   when the first connecting member is in the second condition the second associated object can be inserted and removed from between the first and second walls.

5. The pipe hanger of claim 1 wherein the first connecting member:
   is substantially rigid;
   has a first end that remains connected to the second end of the second wall; and,
   has a second end with a first hook member that receives the first wall when the first connecting member is in the first condition.

6. The pipe hanger of claim 5 wherein the first end of the first connecting member is pivotally connected to the second end of the second wall.

7. A pipe hanger comprising:
   a suspending portion having an attachment surface for use in attaching the pipe hanger to an associated structure that supports the pipe hanger; and, a retaining portion supported to the suspending portion and for use in retaining at least a first associated object, the retaining portion comprising:
a first wall that is substantially rigid and that has first and second ends;
a second wall that is substantially rigid and that has first and second ends;
wherein the first end of the first wall is pivotally connected to the first end of the second wall;
a first connecting member that is adjustable between: (1) a first condition where the second end of the first wall is connected to the second end of the second wall to enclose the first associated object and to hold the first associated object between the first and second walls; and, (2) a second condition where the second end of the first wall is disconnected from the second end of the second wall and the first associated object can be inserted and removed from between the first and second walls; and,
wherein the first connecting member: is substantially rigid; has a first end that remains connected to the second end of the second wall when in the first condition and when in the second condition; has a second end with a first hook member that receives the first wall when the first connecting member is in the first condition; has a second hook member; can be adjusted into the first condition by positioning the first hook member to receive the first wall to space the second end of the second wall from the first wall at a distance D1; can be adjusted into the first condition by positioning the second hook member to receive the first wall to space the second end of the second wall from the first wall at a distance D2; and,
wherein distance D1 is substantially different from distance D2.

8. A method comprising the steps of:
(A) providing a pipe hanger comprising: a suspending portion and a retaining portion supported to the suspending portion; the retaining portion comprising: a first wall that is substantially rigid and that has first and second ends; a second wall that is substantially rigid and that has first and second ends; wherein the first end of the first wall is pivotally connected to the first end of the second wall; and a first connecting member connected to the second wall;
(B) attaching the suspending portion to an associated structure;
(C) inserting a first associated object between the first and second walls;
(D) pivoting the second wall with respect to the first wall toward the first wall;
(E) adjusting the first connecting member to connect the second wall to the first wall to enclose the first associated object and to hold the first associated object between the first and second walls;
wherein step (A) comprises the step of providing an inner surface of the second wall with first and second profiled areas;
wherein step (C) comprises the steps of: inserting the first associated object between the first and second walls to be received in the first profiled area;
wherein after step (C) but before step (D) the method comprises the step of: inserting a second associated object between the first and second walls to be received in the second profiled area; and,
wherein step (E) comprises the step of: enclosing the second associated object and holding the second associated object between the first and second walls.

9. The method of claim 8 wherein:
step (A) comprises the step of: providing the suspending portion with a pair of upper members that extend in substantially opposite directions; and,
step (B) comprises the step of: attaching the suspending portion to the associated structure without the use of fasteners by suspending the pipe hanger from the associated structure with the pair of upper members.

10. A method comprising the steps of:
(A) providing a pipe hanger comprising: a suspending portion and a retaining portion supported to the suspending portion; the retaining portion comprising: a first wall that is substantially rigid and that has first and second ends; a second wall that is substantially rigid and that has first and second ends; wherein the first end of the first wall is pivotally connected to the first end of the second wall; and a first connecting member connected to the second wall;
(B) attaching the suspending portion to an associated structure;
(C) inserting a first associated object between the first and second walls;
(D) pivoting the second wall with respect to the first wall toward the first wall;
(E) adjusting the first connecting member to connect the second wall to the first wall to enclose the first associated object and to hold the first associated object between the first and second walls;
wherein step (A) comprises the step of: providing the suspending portion with a pair of upper members that extend in substantially opposite directions;
wherein step (B) comprises the step of: attaching the suspending portion to the associated structure without the use of fasteners by suspending the pipe hanger from the associated structure with the pair of upper members;
wherein step (A) comprises the step of: providing the suspending portion with a pair of lower members that extend in substantially opposite directions; and,
wherein step (B) comprises the steps of: inserting the pair of upper members into an opening in the associated structure; rotating the pipe hanger with respect to the associated structure; using the pair of lower members to resist upward movement of the pipe hanger; and
releasing the pipe hanger so that the pipe hanger is suspended from the associated structure with the pair of upper members.

11. A method comprising the steps of:
(A) providing a pipe hanger comprising: a suspending portion and a retaining portion supported to the suspending portion; the retaining portion comprising: a first wall that is substantially rigid and that has first and second ends; a second wall that is substantially rigid and that has first and second ends; wherein the first end of the first wall is pivotally connected to the first end of the second wall; and a first connecting member connected to the second wall;
(B) attaching the suspending portion to an associated structure;
(C) inserting a first associated object between the first and second walls;
(D) pivoting the second wall with respect to the first wall toward the first wall;

(E) adjusting the first connecting member to connect the second wall to the first wall to enclose the first associated object and to hold the first associated object between the first and second walls;

wherein step (A) comprises the steps of: providing the first connecting member with a first end connected to the second end of the second wall and with a second end having a first hook member; and, providing the first wall with a groove; and wherein step (E) comprises the step of: attaching the first hook member to the first wall by inserting the first hook member within the groove.

12. A method comprising the steps of:
(A) providing a pipe hanger comprising: a suspending portion and a retaining portion supported to the suspending portion; the retaining portion comprising: a first wall that is substantially rigid and that has first and second ends; a second wall that is substantially rigid and that has first and second ends; wherein the first end of the first wall is pivotally connected to the first end of the second wall; and a first connecting member connected to the second wall;
(B) attaching the suspending portion to an associated structure;
(C) inserting a first associated object between the first and second walls;
(D) pivoting the second wall with respect to the first wall toward the first wall;
(E) adjusting the first connecting member to connect the second wall to the first wall to enclose the first associated object and to hold the first associated object between the first and second walls;

wherein step (A) comprises the step of: providing the first connecting member with a first end pivotally connected to the second end of the second wall and with a second end having first and second hook members spaced from each other along the length of the first connecting member; and, wherein step (E) comprises the steps of: determining which of the first and second hook members to use based on the desired distance between the second end of the second wall and the first wall when the first connecting member is connected to the second wall to the first wall; and, attaching the determined one of the first and second hook members to the first wall.

13. A method comprising the steps of:
(A) providing a pipe hanger comprising: a suspending portion and a retaining portion supported to the suspending portion; the retaining portion comprising: a first wall that is substantially rigid and that has first and second ends; a second wall that is substantially rigid and that has first and second ends; wherein the first end of the first wall is pivotally connected to the first end of the second wall; and a first connecting member connected to the second wall;
(B) attaching the suspending portion to an associated structure;
(C) inserting a first associated object between the first and second walls;
(D) pivoting the second wall with respect to the first wall toward the first wall;
(E) adjusting the first connecting member to connect the second wall to the first wall to enclose the first associated object and to hold the first associated object between the first and second walls;

wherein step (A) comprises the steps of: providing the retaining portion with a third wall that is substantially rigid and that has first and second ends; wherein the first end of the first wall is pivotally connected to the first end of the third wall; and providing the retaining portion with a second connecting member connected to the third wall;

the method further comprising the steps of:
inserting a second associated object between the first and third walls;
pivoting the third wall with respect to the first wall toward the first wall; and,
adjusting the second connecting member to connect the third wall to the first wall to enclose the second associated object and to hold the second associated object between the first and third walls.

14. A pipe hanger comprising:
a suspending portion having an attachment surface for use in attaching the pipe hanger to an associated structure that supports the pipe hanger; and,
a retaining portion for use in retaining at least first and second associated objects, the retaining portion comprising:
a first wall that is supported to the suspending portion and that has first and second ends;
a second wall that has first and second ends;
a third wall that has first and second ends;
wherein the first end of the first wall is pivotally connected to the first end of the second wall with a spring pivot, and the first end of the first wall is pivotally connected to the first end of the third wall with a spring pivot;
a first connecting member that is adjustable between: (1) a first condition where the second end of the first wall is connected to the second end of the second wall to enclose the first associated object and to hold the first associated object between the first and second walls; and, (2) a second condition where the second end of the first wall is disconnected from the second end of the second wall and the first associated object can be inserted and removed from between the first and second walls; and,
a second connecting member that is adjustable between: (1) a first condition where the second end of the first wall is connected to the second end of the third wall to enclose the second associated object and to hold the second associated object between the first and third walls; and, (2) a second condition where the second end of the first wall is disconnected from the second end of the third wall and the second associated object can be inserted and removed from between the first and third walls.

15. The pipe hanger of claim 14 wherein:
the second wall has an inner surface with first and second profiled areas;
the first profiled area of the second wall is sized and shaped to receive the first associated object;
the second profiled area of the second wall is sized and shaped to receive a third associated object;
when the first connecting member is in the first condition the third associated object is enclosed and held between the first and second walls; and,
when the first connecting member is in the second condition the third associated object can be inserted and removed from between the first and second walls;
the third wall has an inner surface with first and second profiled areas;
the first profiled area of the third wall is sized and shaped to receive the second associated object;

the second profiled area of the third wall is sized and shaped to receive a fourth associated object;

when the first connecting member is in the first condition the fourth associated object is enclosed and held between the first and third walls; and, when the first connecting member is in the second condition the fourth associated object can be inserted and removed from between the first and third walls.

16. The pipe hanger of claim 14 wherein:

the first connecting member: is substantially rigid; has a first end that remains connected to the second end of the second wall; and, has a second end with a first hook member that receives the first wall when the first connecting member is in the first condition; and, the second connecting member: is substantially rigid; has a first end that remains connected to the second end of the third wall; and, has a second end with a first hook member that receives the first wall when the second connecting member is in the first condition.

17. The pipe hanger of claim 16 wherein:

the first end of the first connecting member is pivotally connected to the second end of the second wall;

the first end of the second connecting member is pivotally connected to the second end of the third wall;

the first connecting member has a second hook member;

the first connecting member can be adjusted into the first condition by positioning the first hook member to receive the first wall to space the second end of the second wall from the first wall at a distance D1;

the first connecting member can be adjusted into the first condition by positioning the second hook member to receive the first wall to space the second end of the second wall from the first wall at a distance D2;

the second connecting member has a second hook member;

the second connecting member can be adjusted into the first condition by positioning the first hook member to receive the first wall to space the second end of the third wall from the first wall at a distance D3;

the second connecting member can be adjusted into the first condition by positioning the second hook member to receive the first wall to space the second end of the third wall from the first wall at a distance D4;

wherein distance D1 is substantially different from distance D2; and, wherein distance D3 is substantially different from distance D4.

18. The pipe hanger of claim 14 wherein:

the attachment surface comprises: a pair of upper members that permit the pipe hanger to suspend from the associated structure; and, a pair of lower members that aid in maintaining the pipe hanger to the associated structure by resisting upward movement of the pipe hanger; and, the attachment surface attaches the pipe hanger to the associated structure without the use of fasteners.

\* \* \* \* \*